(12) United States Patent
Baverstock et al.

(10) Patent No.: US 11,549,693 B2
(45) Date of Patent: Jan. 10, 2023

(54) HOT WATER TANK

(71) Applicant: WISE EARTH PTY LTD, Swanbourne (AU)

(72) Inventors: Garry Frederick Baverstock, Cottesloe (AU); Sam Peter Paolino, Waterford (AU); Stephen Frederick Lucks, Willetton (AU)

(73) Assignee: WISE EARTH PTY LTD, Western (AU)

( * ) Notice: Subject to any disclaimer, the term of this patent is extended or adjusted under 35 U.S.C. 154(b) by 229 days.

(21) Appl. No.: 16/632,080

(22) PCT Filed: Jul. 17, 2018

(86) PCT No.: PCT/AU2018/050745
§ 371 (c)(1),
(2) Date: Jan. 17, 2020

(87) PCT Pub. No.: WO2019/014711
PCT Pub. Date: Jan. 24, 2019

(65) Prior Publication Data
US 2021/0262676 A1 Aug. 26, 2021

(30) Foreign Application Priority Data
Jul. 17, 2017 (AU) ................. 2017902788

(51) Int. Cl.
*F24D 19/10* (2006.01)
*F24H 1/20* (2022.01)
(52) U.S. Cl.
CPC ......... *F24D 19/1051* (2013.01); *F24H 1/202* (2013.01); *F24D 2200/02* (2013.01); *F24D 2220/06* (2013.01); *F24D 2220/08* (2013.01)

(58) Field of Classification Search
None
See application file for complete search history.

(56) References Cited

U.S. PATENT DOCUMENTS 2,619,879 A 12/1952 Hosea
2,748,249 A * 5/1956 Collerati ................. F24H 1/162
392/481

(Continued)

FOREIGN PATENT DOCUMENTS

AU 2005 100 720 A4 10/2005
AU 2005100720 A4 10/2005

(Continued)

OTHER PUBLICATIONS

Supplementary Partial European Search Report for EP application No. 18835247.0-1008/3655711 PCT/AU2018/050745, dated Sep. 20, 2022, 11 pages.

(Continued)

*Primary Examiner* — Thor S Campbell
(74) *Attorney, Agent, or Firm* — Patterson Thuente, P.A.

(57) ABSTRACT

A hot water tank including: a shell enclosing a chamber containing a heat exchange liquid, the shell including a base, side wall and lid; a cold water inlet connected to a first end of a heat exchanger, and a hot water outlet connected to a second end of the heat exchanger, wherein the heat exchanger is located in an upper portion of the chamber; a primary heating element connected to a power source for heating the heat exchange liquid, the primary heating element being located in a lower portion of the chamber.

23 Claims, 10 Drawing Sheets

(56) References Cited

U.S. PATENT DOCUMENTS

| | | | | |
|---|---|---|---|---|
| 4,409,958 A * | 10/1983 | Fillios | .................... | G05D 23/13 |
| | | | | 122/15.1 |
| 4,469,935 A * | 9/1984 | Candela | .................... | F24H 1/50 |
| | | | | 392/377 |
| 4,602,145 A * | 7/1986 | Roberts | .................... | F24H 1/202 |
| | | | | 99/305 |
| 5,293,447 A * | 3/1994 | Fanney | .................... | G05F 1/67 |
| | | | | 219/508 |
| 6,173,118 B1 * | 1/2001 | Harris | .................... | F24H 7/0433 |
| | | | | 126/344 |
| 6,198,879 B1 * | 3/2001 | Harris | .................... | F24H 7/0433 |
| | | | | 392/451 |
| 6,577,817 B2 * | 6/2003 | Harris | .................... | F24H 7/0433 |
| | | | | 392/479 |
| 7,997,236 B2 * | 8/2011 | Pussell | .................. | F24H 9/0021 |
| | | | | 122/13.01 |
| 8,909,033 B2 * | 12/2014 | Kreutzman | ............. | F24H 1/201 |
| | | | | 392/458 |
| 9,002,185 B2 * | 4/2015 | Kreutzman | ......... | F24D 17/0031 |
| | | | | 392/447 |
| 10,591,183 B2 * | 3/2020 | Clark | ...................... | F24H 1/182 |
| 2010/0037889 A1 * | 2/2010 | Gordon | .................. | G05D 23/24 |
| | | | | 126/611 |
| 2013/0186385 A1 * | 7/2013 | Choudhary | ............. | F16L 59/08 |
| | | | | 312/409 |
| 2014/0010522 A1 * | 1/2014 | van der Heijden | ......................... | |
| | | | | F24D 17/0047 |
| | | | | 392/451 |
| 2014/0348493 A1 * | 11/2014 | Kreutzman | ........... | H01L 31/042 |
| | | | | 392/441 |
| 2015/0104160 A1 | 4/2015 | Butler | | |
| 2016/0195284 A1 * | 7/2016 | Chaudhry | ........... | F24D 19/1069 |
| | | | | 219/494 |
| 2018/0231258 A1 * | 8/2018 | Armstrong | ............. | F28D 7/024 |
| 2019/0338962 A1 * | 11/2019 | Minnoy | ................ | F24D 17/001 |
| 2020/0393202 A1 * | 12/2020 | Armstrong | ............. | F24H 1/201 |

FOREIGN PATENT DOCUMENTS

| | | |
|---|---|---|
| AU | 2010200738 A1 | 9/2010 |
| CN | 101627263 A | 1/2010 |
| CN | 201779841 U | 3/2011 |
| CN | 103123230 A | 5/2013 |
| CN | 106323046 A | 1/2017 |
| CN | 106500371 A | 3/2017 |
| DE | 198 07 492 A1 | 8/1999 |
| EP | 20 31 333 A2 | 3/2009 |
| GB | 2484099 A | 4/2012 |
| WO | WO-9112472 A1 | 8/1991 |

OTHER PUBLICATIONS

Office Action for CN 201880047447.1, dated Feb. 3, 2021, 8 pages.
International Search Report for PCT/AU2018/050745, dated Sep. 25, 2018, 3 pages.
Written Opinion of the ISA for PCT/AU2018/050745, dated Sep. 25, 2018, 3 pages.
International Preliminary Report on Patentability for PCT/AU2018/050745, dated Sep. 25, 2018, 13 pages.
Office Action and Search Report dated Dec. 20, 2021 for Chinese Application No. 201880047477.1, 18 pages.
Patent Examination Report 1 dated Sep. 12, 2022 for New Zealand Application No. 761762, filed Aug. 2, 2021, 5 pages.

* cited by examiner

HOT WATER TANK

RELATED APPLICATIONS

The present application is a National Phase entry of PCT Application No. PCT/AU2018/050745, filed Jul. 17, 2018, which claims priority from AU Patent Application No. 2017902788, filed Jul. 17, 2017, said applications being hereby incorporated by reference herein in their entireties.

FIELD OF THE INVENTION

The present invention relates to a hot water tank and in particular a solar hot water tank which is particularly advantageous for the production of energy efficient hot water.

BACKGROUND TO THE INVENTION

Solar water heaters operate by collecting solar radiation on an absorber glazed flat plate or an array of evacuated tubes. Usually a thermosiphon configuration with the panels and tank ensures that hot water is directed to a mains pressure tank (horizontally or vertically or at ground level in the case of pumped systems).

Referring to FIG. 10 a typical solar hot water system 200 is shown. The system includes a storage tank 202 horizontally mounted, with a cold water inlet 204 on the end of, and towards the bottom of the water storage tank 202, and a hot water outlet 203 on the end, and towards the top of the tank 202. The capacity of the tank 202 is usually based on the demand for hot water at the installed premises. For example a home with four adults would usually require a greater storage capacity as compared to a home with two adults.

The tank 202 is connected to a heat or solar collector 201, generally comprising a series of heat collector pipes 210, and is typically installed on the roof of a house.

Colder water will tend towards the bottom of the tank 202 represented as item 207, and hotter or heated water will rise towards the top of the tank 202 represented as item 208. The colder water 207 passes out of the tank 202 and through a pipe 205 into the heat collector pipes 210. Commonly users may refer to the heat collector pipes as the solar panels. After passing through the heat collector pipes 210 the heated water then returns to the tank 202 via pipe 206.

The domestic hot water supply will thus pass into the tank 202 and then through copper tubes housed in the solar collector 210. Thermal energy from the sun will heat the water in the solar collector 210. Heated water is then returned to the tank 202, and is then available to a user.

An alternative conventional solar hot water system is shown in FIG. 9. This arrangement is similar to the system of FIG. 10, however, water is pumped from the water storage tank 104 usually located on the ground, to the solar heat collector 100 usually located on the roof. That aside the operation is similar. Mains cold water enters the tank 104 through a mains cold water inlet 105 located on the side and towards the bottom of the tank 104.

Cold water 106 settles towards the bottom of the tank 104, and heated water 102 settles towards the top of the tank 104. The cold water 106 is pumped 107 via a pipe 108 to a solar heat collector 100. The water passes through a number of tubes in the solar heat collector enabling the water to be heated. The heated water then passes back to the tank 104 via pipe 101.

The cold water pipe 108 effectively passes through the side wall of the tank 104 towards the bottom of the tank 104 where the cold water 106 has settled. Conversely, the heated water returning from the solar collector 100 via the heated water pipe 101, passes through the side wall of the tank 104 in the upper portion of the tank 104. In this way mixing of the cold water and heated water is minimised, ensuring that when needed the hottest water is available to the user. It is necessary for the water inlet 105 and outlet 103 to be located near the bottom and top of the tank respectively to ensure that only hot water is released from the tank.

Heated water 102 is then available to a user via hot water outlet 103. In use, as the user extracts water via the outlet 103, an equal amount of water is added via the inlet 105.

In some circumstances in both prior arrangements, such as on overcast days with low sunlight, there may not be sufficient heat generated by the solar collector 100, 201 to heat the water in the tank 104, 202. To guard against this possibility the hot water systems also include a separate heating element 109, 209 that becomes the booster for the system. The heating element 109, 209 is connected to AC mains supply. If required this separate element 109, 209 can heat the water.

Solar water heaters, whether horizontally mounted or vertically mounted, will usually have an extra booster included to add heat when solar thermal energy is not sufficient from the panels in winter or cloudy weather conditions. Typically, in horizontal systems the booster 209 passes through the end of the tank 202 towards the lower half of the tank 202, and above the inlet 204. For vertical systems, the booster 109 passes through the side wall of the tank 104 in the lower third of the tank 104 and again at a point higher than the water inlet 105. In both cases the location of the booster is an attempt to best heat the water in the tank. In particular, water heated by the booster is not directly impacted by incoming cold water. Nor is the booster adversely affected by receiving high temperature readings if it was located in an area of hot water. The desire of the system is to ensure the entire water supply in the tank is heated. By locating the booster lower in the tank this can be better managed.

While such systems can provide hot water they also have a number of limitations.

Most solar water heaters are main pressure vessels in steel (glass lined) with internal pressure limits of 450 to 800 kPa, similar in stainless steel or reduced pressure systems for copper (165 kPa). Mains water supply can have pressure pulsations or fluctuations in the basic pressure of the water. These fluctuations can lead to mains pressure related failures from pulsation driven metal fatigue and resultant crevice corrosion starting with micro cracks in the enamel lining inside the tank protecting the steel. The micro cracks usually start inside the tanks, at end welds or at side penetration points through the wall of the tank.

Poor water quality can also accelerate degradation and premature failure of hot water systems. In poor quality water there are usually high levels of dissolved salts including bicarbonate present. Carbonate (or more commonly known boiler scale) build up occurs from heating of the usually dissolved bicarbonate salts in poor quality water, precipitating solid salts out of solution. The solid salts can then block hot water supply pipes from the system, and in particular the copper pipes in traditional solar thermal panels or in the valves. It is not uncommon for panels to heat up above 80° C. in summer, thus creating this degrading chemical reaction.

All solar hot water systems have relied on placing water inlets and outlets, and booster entries through the side-wall of the tank. In relation to horizontal tanks the end of the tank may effectively be considered a side wall. These side wall entries have been necessary in part to ensure that the supply of hot water is not compromised. To enable the entries penetrations are made in the side wall of the tank. That is, holes are bored through the wall of the tank to allow pipes and any other necessary parts to pass into the tank. These cuts or penetrations expose the wall to corrosion. Each penetration requires a water proof seal capable of withstanding the pressure exerted on the side wall of the tank. Each penetration also increases the risk of failure. In particular it can create a weak point emanating from any slight imperfections during the assembly process in finalizing the tank and its components. This choice for the common location of penetrations creates complexity in manufacturing, weak points for leakage, corrosion and additional maintenance costs. However, while the sidewall penetrations cause known problems they have been necessary for the function of traditional systems.

A further known problem originates from a safety feature. It is known for bacteria to thrive in water environments. To avoid infected water being passed to a user, the hot water systems ensure that the water is heated to at least 60 degrees Celsius. Tempering valves are then installed at each outlet tap to mix cold water with the hot water so as to reduce the water temperature to a safe level. This is inefficient as extra energy is needed to heat the water only to need to cool it back down. In addition it is not uncommon for these valves to require extra maintenance.

Valve failure is also a common point of weakness in solar water heaters. This is exasperated due to the excessive numbers of valves that are needed for basic solar water heater mains pressure systems. Because the tank is pressurized to mains pressure, and because the heated water in the tank is also the supply water to the house, there are a number of extra valves added for safety reasons. For example, extra valves, such as pressure relief valves, are included in the tank to release steam pressure when the solar panels over heat the tank water. Similarly, solar thermal panels need the same pressure release valves to prevent steam pressure in hot conditions. In a number of localities solar thermal panels may also require a frost valve. These frost valves work by allowing warm water from the tank to flow through the panels and thereby reduce the likelihood of the water freezing in the pipes in the panels, and splitting the pipes creating failure of the system. This all increases the maintenance costs of solar waters heaters.

It is desirable to provide an improved hot water system that ameliorates some of the above identified problems.

SUMMARY OF THE INVENTION

In a broad form, there is provided a hot water tank wherein all penetrations into the tank are through the top of the tank.

In another broad form, there is provided a hot water tank including a double coil heat exchanger.

In a first aspect, there is provided a hot water tank including:

a shell enclosing a chamber containing a heat exchange liquid, the shell including a base, side wall and lid;

a cold water inlet connected to a first end of a heat exchanger, and a hot water outlet connected to a second end of the heat exchanger, wherein the heat exchanger is located in an upper portion of the chamber;

a primary heating element connected to a power source for heating the heat exchange liquid, the primary heating element being located in a lower portion of the chamber.

In one arrangement the heat exchanger includes a parallel set of coils running from the first end to the second end.

The primary heating element may be a DC element connected to a photovoltaic panel array. All penetrations into the tank may pass through the lid. That is for example the cold water inlet, the hot water inlet and the primary heating element may pass through the lid.

In an alternative arrangement, the primary heating element may be an AC element, and further the tank could be adapted to receive excess energy from an external power source or institution.

Conveniently the primary heating element may be housed in a housing to better ensure accurate placement of the primary heating element.

In some arrangements the heat exchanger is located in the top half of the chamber, and the primary heating element is located in the lower third of the chamber. Preferably the primary heating element is located nearby the base.

In a possibly arrangement the primary heating element is suspended in the heat exchange liquid, and ideally from or through the lid.

In a second aspect there is provided a solar hot water tank including:

a cylindrical shell enclosing a chamber containing a heat exchange liquid, the shell including a base, side wall and lid;

a cold water inlet connected through the lid to a first splitter of a first end of a heat exchanger immersed in the heat exchange liquid, and a hot water outlet connected through the lid to a second splitter of a second end of the heat exchanger, wherein the heat exchanger is located in an upper portion of the chamber, and includes a parallel set of coils liquidly connecting the first and second splitters;

an element housing passing though the lid and towards the base, the element housing adapted to locate a DC heating element nearby the base for heating the heat exchange liquid, the DC heating element being connected to a photovoltaic array.

In preferred arrangements, the tank will further include a second heating element connected to a second power source, the second heating element being positioned inside the heat exchanger. The second heating element could be an AC element connected through the lid to mains power. The tank may further include a fill pipe passing through the lid to enable the heat exchange liquid to be added or removed from the shell The heat exchange liquid could be water treated with tannin.

In the preferred embodiment, the shell will be formed of plastic, and ideally the walls of the shell will be corrugated.

It is expected that the shell will be encased in insulation. The insulation can be preformed to accommodate a cylindrical profile capable of encasing the shell. If the shell walls are corrugated it is expected that the preformed insulation will abut each of the peaks of the corrugation. In this way, not only do the corrugated walls add strength to the shell, but space is formed at least between the insulation and troughs of the corrugation, enhancing the thermal resistance of the tank.

A reflective aluminum outer skin could also be further included around the insulation, for further strengthening and thermal resistance.

In various arrangements, the tank will further include a controller to effectively switch the heating elements on or off.

BRIEF DESCRIPTION OF THE DRAWINGS

An illustrative embodiment of the present invention will now be described with reference to the accompanying figures. Further features and advantages of the invention will also become apparent from the accompanying description.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
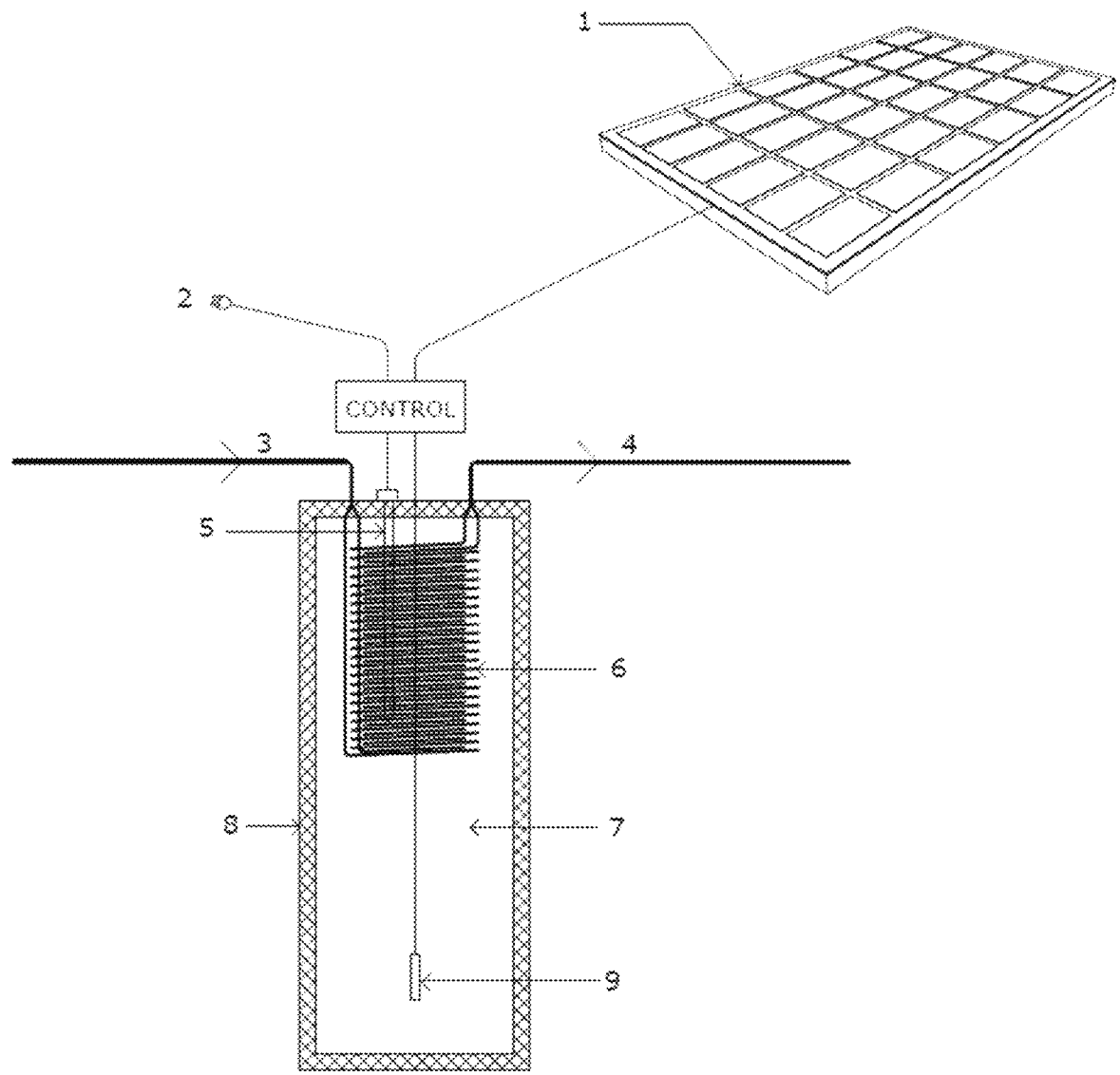
FIG. 1 shows an overview of the system of the present invention.

Referring to FIG. 1, the basic arrangement of the present invention is shown. The system includes a tank 8, preferably constructed out of plastic, although in other embodiments it could be made of metal. Plastic is preferred to metal as the plastic enhances the thermal resistance of the wall of the tank. It is thought that the most cost effective procedure for the production of the preferred embodiment being a polyethylene corrugated tank utilises a spun plastic process. Ideally the wall of the tank will include an insulating material such as polyurethane. The polyurethane could be made out of organic material in the future and the thermal resistance is about twice as good as polystyrene. The polyurethane could be moulded or wire cut to its component design shape. It is rigid and has good compressive strength capable of providing extra support.

The tank 8 can be installed at ground level externally under the eaves of traditional houses, which is the usual positioning for most conventional gas or electric storage systems.

The tank 8 includes a water inlet 3 and a water outlet 4, with both preferably located at the top of the tank 8. Water passes in the water inlet 3, through a heat exchanger 6, and out through the water outlet 4. In this way the water does not mix with the contents of the tank 8.

The tank also includes a heating element 9 located near the bottom of the tank 8. The element 9 is ideally a DC element and connected to a solar photovoltaic panel 1 preferably through the top of the tank 8. The photovoltaic panel array may be located on the roof of a building, or any other convenient location that will receive sufficient sunlight.

In an alternative arrangement, for grid connected regions the bottom DC element could be substituted with a similarly located AC element. During daylight hours this allows dumping of excess energy from the grids that are prone to peaks of renewable energy in the grid. The rating of the AC booster could be increased to 3 kW or more to allow faster use when available during peak excess supply periods. A special control function could be added to the control regime and the functions developed and finally programming in conjunction with the state power authorities. This way these authorities could shed or dump excess power from the grid knowing the energy will be stored in thermal energy. This would reduce the need for power authorities to maintain expensive battery banks, and also reduce the use of batteries for the consumer in their domestic system. Water heating can also be used during off or low peak use periods in the grid making it even cheaper for the consumer to heat water.

In some arrangements an alternative power source to the photovoltaic panel may be used. For example a wind generator, a hydroelectric power source or a generator may be used.

The tank 8 is filled with a heat exchange liquid 7 such as water with a de-oxygenated mixture, such as tannin added.

Sunlight on the photovoltaic panel 1 generates electricity to power the heating element 9. When in operation the element 9 transfers energy or heats up the primary or heat exchange liquid 7 in the tank 8. As the liquid 7 is heated it rises to the top of the tank 8 allowing any cooler liquid 7 to fall to the bottom of the tank 8. In this way the liquid 7 at the top of the tank 8 would generally be hotter than the liquid 7 at the bottom of the tank 8. Practically at some point the temperature of all the liquid 7 in the tank 8 would be similar.

On overcast days, times of low sunlight, or heavy usage, the photovoltaic panel 1 may not generate sufficient energy to heat the liquid 7. To address this, the preferred arrangement also includes a second heating element 5 that is connected to an AC mains power supply 2 or some other power source. This connection also preferably passes through the top of the tank 8. It is thought, that if necessary the system could be boosted (via the second heating element) entirely at night from off peak power (if available), thereby reducing costs and providing relatively low cost water over 24 hours, due to the high efficiency of the thermal storage maintained in the heat exchange liquid in the tank.

The second heating element 5 should be located towards the top of the tank 8, and/or proximate the heat exchanger 6. If the second heating element 5 was located in the middle or towards the bottom of the tank 8 it would operate in the same way as the first heating element 9. However by locating the second heating element 5 at the top, near the rising hot primary liquid it will operate to better ensure the liquid 7 around the heat exchanger 6 is at optimum or as best as can be in the circumstances, in providing hot liquid to the heat exchanger.

When a user requires hot water, cold or mains water is pumped into the inlet 3 or at mains pressure through the heat exchanger 6. As the water passes through the heat exchanger the water is heated by transference of heat from the liquid 7 through the heat exchanger 6 to the water. The heated water then passes out the outlet for use by the user.

The preferred arrangements will also include at least some basic controls. The controls could detect when the photovoltaic panel 1 is not generating sufficient power and determine whether the second heating element 5 should be turned on. Such a decision may also be based on the temperature of the liquid 7. For example, the controller may also sense the temperature of the liquid 7, and if the temperature falls below a predetermined minimum temperature the second heating element 5 is turned on.

In other cases if the controller senses that the temperature of the liquid is above a predetermined threshold it will switch the first and/or both heating elements 5, 9 off. In this case the system may also be configured to transfer power generated from the photovoltaic panels 1 back into the mains grid.

Ideally the controller would sense the temperature of the liquid 7 at the top of the tank 8 when determining to switch on the second element 5, and conversely sense the temperature of the liquid 7 at the bottom of the tank 8 when determining to switch off the first element 5. In this way when the temperature around the heat exchanger 6 is low, the second heating element 5 can be turned on to better ensure a supply of hot water. Similarly, if the temperature of the liquid 7 near the bottom of the tank 8 reaches a threshold it means all the liquid 7 in the tank has been heated and further heating is not required.

As shown in FIG. 1, the tank could be created as a sealed system. That is, all the elements inside the tank are generally not accessible from outside. This could potentially simplify installation and reduce maintenance requirements. Alternatively, the elements inside the tank may be accessible by providing a lid or other access port on the top of the tank. Such access would allow for repair or replacement of any faulty parts inside the tank.

Figure 2:
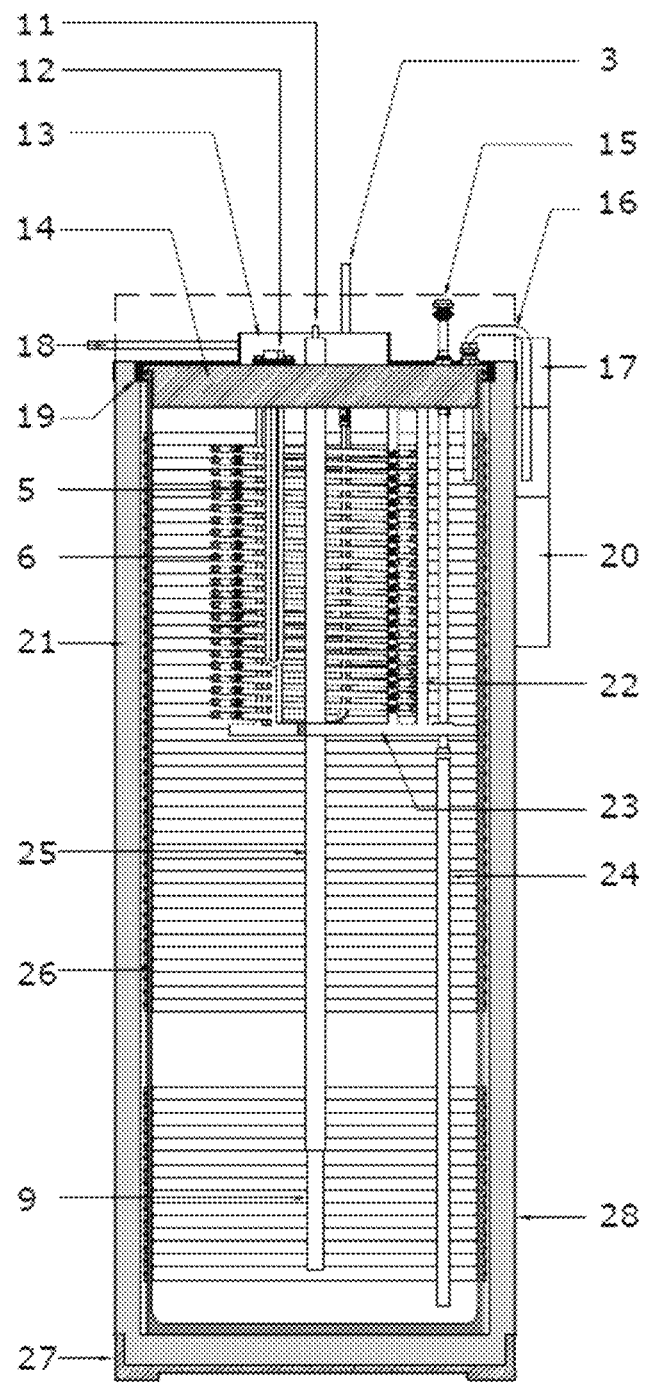
FIG. 2 is a cross sectional view of a tank in one embodiment of the present invention.

Turning to FIG. 2, a preferred embodiment is shown. In this embodiment the tank 26 has been formed of corrugated walls for added strength. Although non corrugated walls could also be used, the added strength of the corrugations is an advantage especially during transportation or delivery to the installation destination. The walls are preferably constructed from a plastic material such as polyethylene, polybutylene, or another material suitable for injection moulding.

The plastic tank 26, should be resistant to degradation or deformation and maintain full structural strength at temperatures less than 80° C. It is thought that structural integrity of 10 mm thick polyethylene maintains full structural strength at 100° C. for a prolonged period and is thus a suitable choice. Moreover as such an extreme temperature is not expected to occur in the present invention. Internal temperatures are always expected to be below 60° C., negating any structural weakening problems in the plastic tank.

In some implementations it may also be decided to use moulded carbon-based nanotechnologies given the relatively simple profile of the tank. Another alternative to plastic is stainless steel or copper although this is likely to be more expensive and heavier to transport. A plastic tank is preferable as it is inert to corrosion, and has a better thermal resistance compared to metal tanks.

The tank 26 can be encased in an insulation material 21 such as moulded or wire cut polyurethane to avoid any thermal bridging. The insulation material seeks to minimise temperature loss overnight with the goal to keep system losses to 1-3 kWh per day or less throughout the seasons in most temperate climates. Preferably the insulation material 21 will not stick to metal or any other plastic components.

In the preferred embodiment, the insulation will be preformed prior to construction of the tank. The insulation could be preformed to fit the exact shape of the tank. However, it is actually preferred to preform the insulation to accommodate a generally cylindrical shaped tank, including when the tank is corrugated. An imperfect mould for the insulation results in air pockets which can be advantageous. This method of assembly of the insulation around the tank increases the overall thermal efficiency of the tank compared with standard systems. The moulded cylindrical shaped foam insulation creates a small thin air resistance up against the aluminium outer skin, as well as on the inside up against the inner plastic tank creating partial sine-wave shaped air gaps between the corrugated profile plastic tank and the relatively smooth vertical surface of the abutting insulation. This extra surface air resistance adds substantially to the reflective outer skin as well as the main foam insulation. This maintains maximum thermal inertia in the tank over 24 hours.

A disadvantage of conventional systems is that injected insulation material is usually applied, which then sticks to and adheres components together. By adopting the use of polyurethane the insulation material should not adhere to any components. This will allow for dismantling moulded side insulation panels and separate top and bottom shaped insulation for any unlikely repairs, and reuse of the insulation panels and shapes. These components could for example be reused in retrofitted or second hand reconditioned systems.

Further alternative materials for the insulation material 21 could include polystyrene. In the preferred arrangement the insulation material will be between 35 mm and 125 mm thick depending on location. In one arrangement the top and bottom of the tank 26 is insulated with between 75 mm and 125 mm, and preferably 100 mm, of polyurethane at the top, between 40 mm and 60 mm, and preferably 50 mm at the bottom, and between 35 mm and 55 mm, and preferably 45 mm to the sides. While the same amount of insulation could be provided to all exteriors parts, it is preferred to have more insulation at the top as this is where the hottest water rises and therefore there would be increased heat transfer losses at this point. The sides have the advantage of extra air gaps between the plastic tank and the insulation greatly increasing the thermal insulation. Therefore, slightly less insulation is needed.

Also this embodiment creates a tea-pot radiative insulation effect or inward reflective radiation reducing conductance and therefore improving the overall insulation effect of the composite wall. This reduces the need for thicker insulation on the side wall of the tank. Thermal radiation is reflected back into the system from the shining inner and outside surface of the polished aluminium skin. The purpose of the insulation material is to reduce heat loss from the tank and thereby improve the energy efficiency of the hot water system.

The insulation material is protected by an aluminium outer skin 28, or other protective material. The outer skin 28 could for example also be formed from a hardened plastic. Preferably the outer skin 28 will also be reflective to aid further in preventing heat loss.

Ideally the insulation 21 is moulded or wire cut polyurethane foam cut into two shapes. The shapes may be two complementary segments that surround the tank 26 and are held in place by the outer stress aluminium sheet 28. Preferably the insulation levels are as follows:

Walls 0.199 W/m2K Maximum winter losses 0.267 kWh/day

Top 0.746 W/m2K Maximum winter losses 0.125 kWh/day

Bottom 1.456 W/m2K Maximum winter losses 0.244 kWh/day

Total winter losses=−0.635 kWh/day

Small air gaps between the pre-shaped insulation 21, tank 26 and outside sheeting surfaces 28 increases the overall surface air resistances further improving the insulation rates beyond normal hot water technologies.

The tank 26 should itself be fully self-supporting, with the insulation 21 and stressed aluminium skin 28 a bonus addition to the wall strength of the tank 26. In the preferred arrangement the outer skin is aluminium sheeting 28 that holds the insulation components in position and provides additional wall support. The metal skin also adds extra impact resistance to mechanical damage. As well as providing "teapot-effect" insulation improvement to the overall thermal efficiency.

In some installations it may be decided not to include any insulating material or outer skin. If this is the case the invention will still work, however, it will not be as efficient. In particular it is expected that more energy will be required to maintain the desired temperature in most cases.

In some embodiments the tank would also include a moulded plastic base 27. The use of a material such as moulded plastic reduces any thermal bridging between the tank and ground, maximizing the efficiency of the insulation. It also has the strength needed and could reduce cost.

The tank 26 is filled with a heat exchange liquid such as water with a corrosion inhibiting additive. In a preferred arrangement the properties of the heat exchange liquid include a thermal storage capacity of 4200 kJ/M$^3$.

Figure 6:
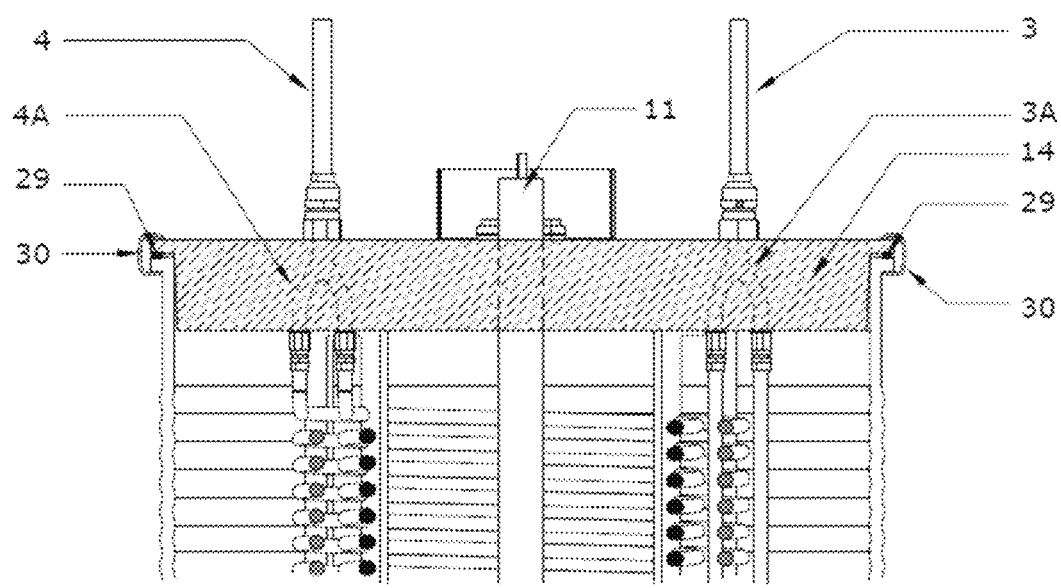
FIG. 6 shows cross sectional detail of the lid in one embodiment of the present invention.

The top of the tank is enclosed by a lid 14 which ideally will be moulded plastic, to seal the heat exchange liquid in the tank 26. This seal may be improved by implementing a lid edge clamp and seal 19. Including a lip on the inside wall of the tank 26 also allows for easier closing of the lid 14. The liquid seal can be further improved through the use of a gasket 29 (FIG. 6) and a lid side clamp 30. The clamp 30 allows access to the inside of the tank 26, while also making the assembly both water and air tight.

The various components are able to pass through the lid 14 and into the heat exchange liquid in the tank 26. In a preferred arrangement a DC element cable housing 25 is suspended from, and passes through, the lid 14. At the top of the housing 25 is a DC element port 11. A DC element 9, or primary heating element, passes through the element port 11 and is suspended towards the bottom of the tank 26 by a cable connected to a solar photovoltaic panel or alternative power source. Ideally, the primary heating element 9 would also be located near to the central axis of the tank 26, as well as being near the bottom of the tank. Such an arrangement stimulates the highly efficient internal heat distributing currents discussed below.

The housing 25 is not essential to the invention, however, it allows for easier maintenance or replacement of the element 9 if necessary and also accurately locates the element in the correct position. That is, the element can be extracted simply by pulling the cable back though the element inlet port 11. While the element 9 could be removed if no housing is present, this would entail removal of the lid 14 in some installations if the lid has not been designed for possible removal of the element 9.

In use, the element 9 will heat the heat exchange liquid in the tank 26. It is the liquid about the element 9 that will be heated. As this liquid is heated it will rise towards the top of the tank 26 and cooler liquid will descend. This process will continue with the warmer liquid moving to the top of the tank 26. At some point all the liquid in the tank will effectively be a similar temperature. In actuality there could be up to a 10° C. to 15° C. temperature difference between the top of the tank and the bottom on occasions during water use and cold weather conditions.

In a preferred arrangement, once the liquid has reached a predetermined temperature the heating element 9 will be switched off until the liquid cools. This can guard against overheating of the liquid. In this case the power to the heating element 9 could be diverted to other uses.

It is envisaged that the present invention would be part of a solar hot water system and that the element 9 would be connected to a solar photovoltaic panel. This has the advantage of providing power generated by the sun. However, on cloudy or overcast days, or in areas or times of low sunlight, there may not be enough power supplied to the element 9 to heat the heat exchange liquid. Alternatively, high water usage may have effectively drained the system. To address this, the tank also includes a second element 5 connected via a second element inlet 12 to an alternative power source. It is expected that this alternative power source will be mains power, although another alternative could be a generator.

Previously AC boosters have always entered through the side wall of a vertical tank, and have usually been located towards the middle of the tank to suit the open volume and internal currents of a pressure type vessel.

Unlike conventional systems, in the preferred embodiment of the present invention, for better operation the second element 5 will be suspended towards the top of the tank 26 and proximate the heat exchange coils 6. This will enable the heat exchange liquid about the heat exchanger 6 to be more quickly heated, and hot water provided sooner when primary heating is not at full capacity. Ideally, the second element 5 would be centralised as much as possible to the coils of the heat exchanger 6 for boosting and acting as an instantaneous heater element when needed in cold or cloudy weather conditions. In the preferred arrangement it is expected that the amount of boosting required will be minimal. It is therefore thought that as long as the second element 5 is located in the void of the heat exchanger it should function sufficiently for the requirements. Most of the heat to the system will be provided by the heating element 9 each day. As long as the booster or second element 5 is inside the central void of the heat exchanger it will function as intended. In some extreme installations it may be more important to ensure the second element 5 is centralised.

In some applications the cables to the two heating elements may pass through an electrical connections box or housing 13 located on the lid and through a common conduit 18. This is not essential but rather purely for simplification of installation, and to ensure the connections are not accidentally accessed by householders.

If it is regulated, or desired, a tank overflow pipe 16 may also be included. Should the heat exchange liquid expand, or some other event occurs that increases the pressure inside the tank 26, some of the heat exchange liquid will be able to escape through the tank overflow pipe 16 and conveniently into an expansion tank 17. The inclusion of the tank overflow pipe 16 mitigates the risk of explosion from high pressures inside the tank by effectively enabling the pressure inside the tank to be eliminated through this open venting mechanism. In some embodiments the overflow pipe and expansion tank may be configured to facilitate the return of the liquid if the expansion pressure in the tank subsides.

In the embodiment shown, a control panel 20 is also shown. In this case the control panel 20 is located below the expansion tank 17 for ease of manufacturing. The control panel 20 is expected to be inside a housing of similar dimension to the expansion tank, although in some cases a housing may not be provided. While the control panel 20 may provide some control to the user it will be appreciated that the system could be created without a control panel. In this case the system would largely be a passive system in that the elements would continue to heat the heat exchange liquid.

In the preferred arrangement the control panel 20 could provide a range of functions depending on the implementation. These could include:

1. Switching the element 9 off when a predetermined temperature is reached, and switching it on again when the temperature falls below that predetermined threshold.
2. Switching element 5 on if the temperature is below a predetermined threshold and switching it off again when another predetermined temperature is reached.
3. Engaging the switching on and off of elements 5, 9 only during predetermined time periods
4. To switch the system off—for example if the user will be away for a period of time.
5. Time clock regimes for off peak boosting predominately at night.

Figure 8:
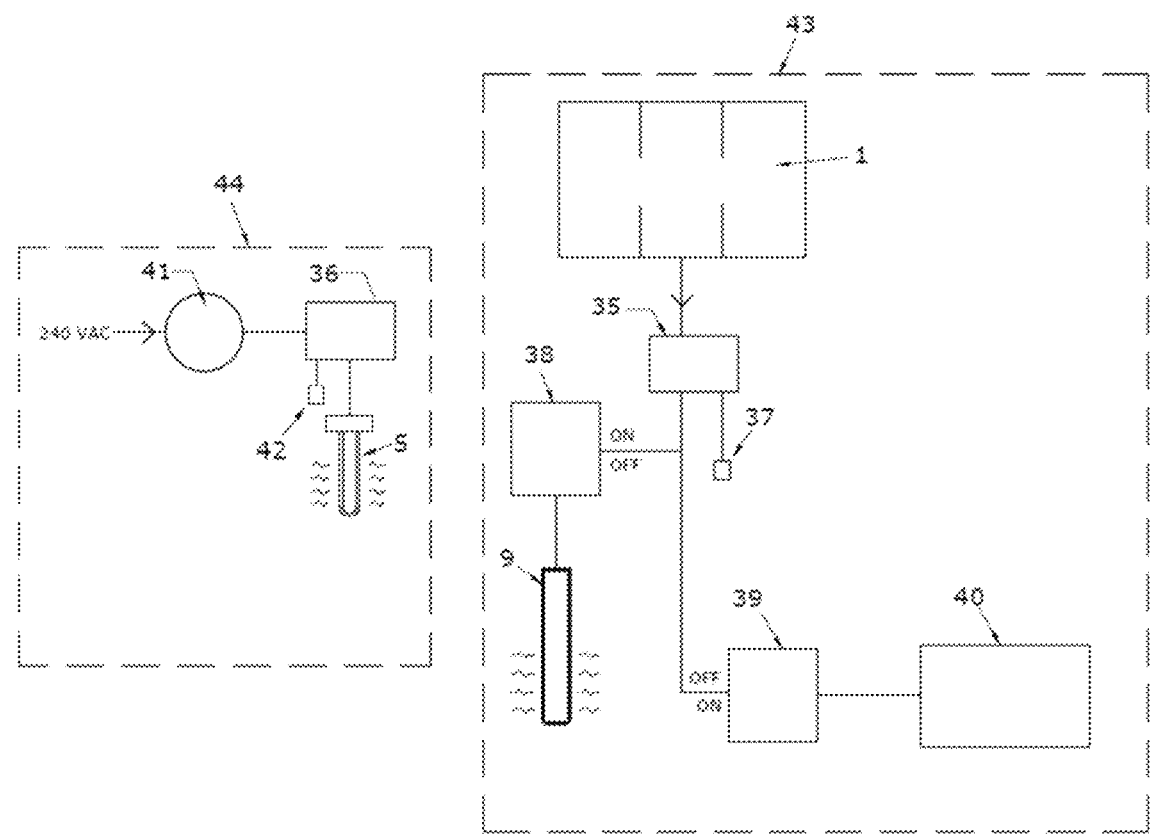
FIG. 8 shows a functional diagram of a possible control system for the present invention.
Figure 9:
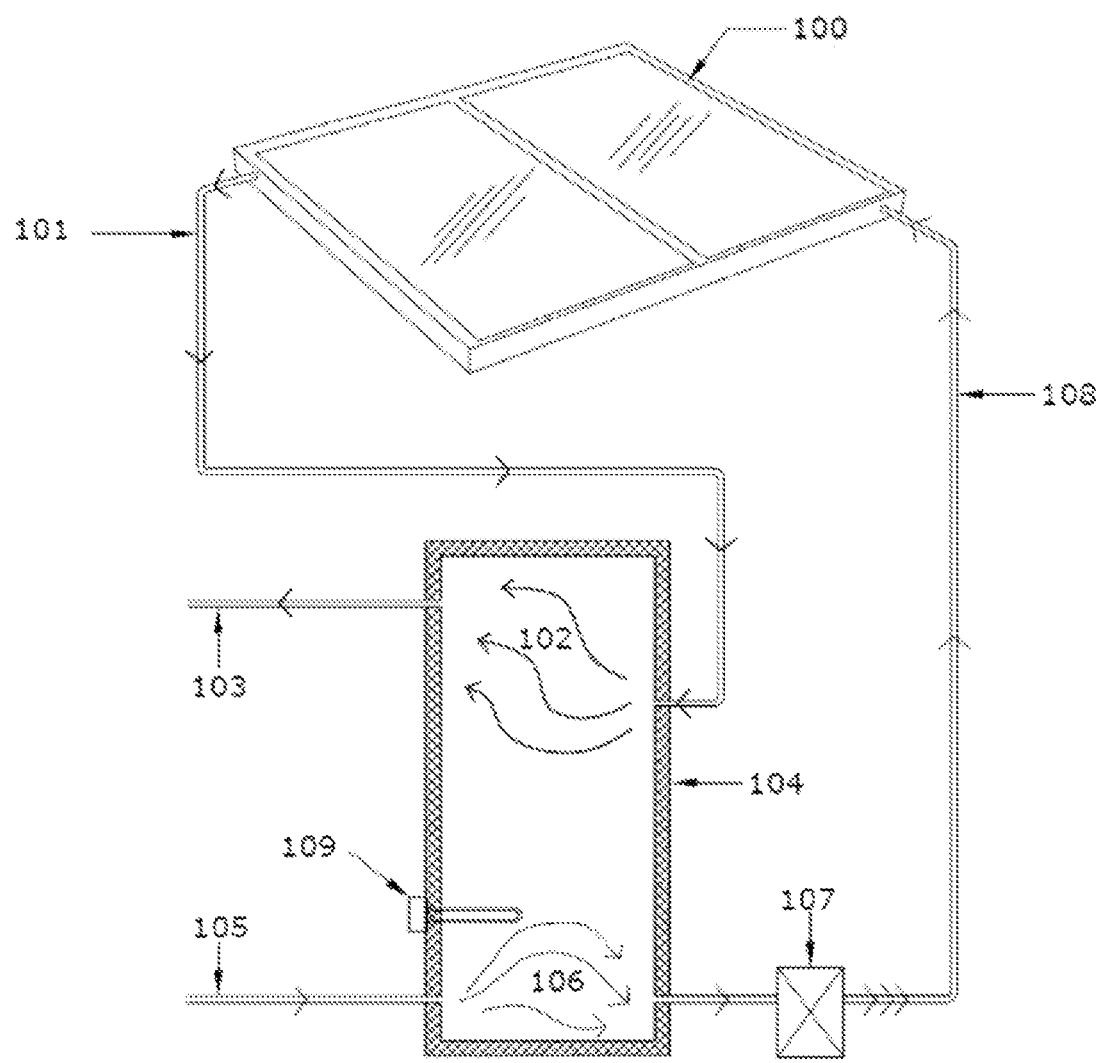
FIGS. 9 and 10 show conventional solar hot water systems.
Figure 10:
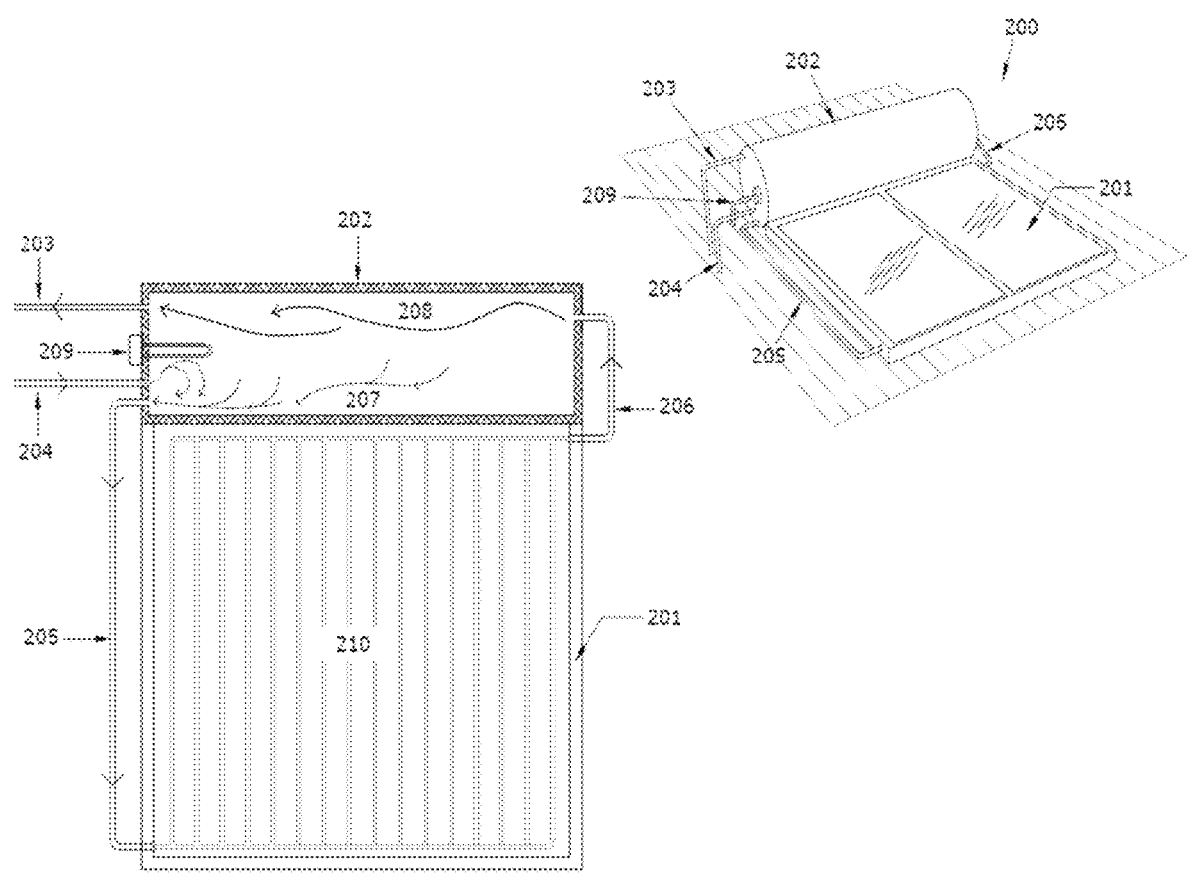

Referring to FIG. 8, two control systems are shown for one embodiment—namely a DC heating element control or primary controller 43, and an AC booster control or secondary controller 44. The DC heating element control 43 is used to control the operation of the heating element 9, and the AC booster control 44 can be used to control the second heating element 5.

The primary controller includes a first temperature sensor 37 connected to a first thermostat 35 and located to measure the temperature of the heat exchange liquid 7. The thermostat and temperature sensor could come as a combined unit, for example a bimetal capillary thermostat. Conveniently the first temperature sensor 37 may be located inside the tank 26, and preferably in the lower portion of the tank 26. Ideally the first temperature sensor 37 will not be proximate the heating element 9 so as to avoid sensing the temperature of recently heated liquid. It is preferred to read the temperature of liquid not under immediate heat. The lower portion of the tank is also preferred to measure the temperature of notionally cooler liquid compared to liquid at the top of the tank. It will be appreciated however that the temperature sensor 37 could be located in any location capable of measuring the temperature of the liquid, provided that consideration is made for the location in operation of the controller.

When the first thermostat 35 via the temperature sensor 37 detects that the temperature of the heat exchange liquid 7 is below a predetermined temperature a first switch 38 can be activated to turn the heating element 9 on. This can be achieved by allowing electrical energy from the photovoltaic panels 1 (or other power source) to be directed to the heating element 9. When the first thermostat 35 via the temperature sensor 37 detects that the temperature of the heat exchange liquid 7 is above a predetermined temperature the first switch 38 can be activated to turn the heating element 9 off. This could be achieved by cutting the supply of electrical energy to the heating element 9.

In some embodiments it may be preferred not to have a primary controller 35. In this case the heating element 9 would always be on. In other arrangements, rather than have a temperature activated controller the thermostat and temperature sensor could be replaced with a timer.

In the arrangement shown in FIG. 8, the primary controller includes a second switch 39 that enables the electrical energy from the photovoltaic panels 1 to be passed to an inverter 40 when the heating element 9 is not required. The inverter 40 could be used to power other devices of the user or added/returned to a mains power grid. In some arrangements first switch 38 and second switch 39 could be combined into a single switch that passes power either to the heating element 9 or inverter 40.

In the arrangement shown the secondary controller 36, uses both a timer 41, and a second thermostat 36 and second temperature sensor 42. The second temperature sensor 42 could again be located in any location that would allow the temperature of the heat exchange liquid 7 to be determined. It is preferred however to locate the second temperature sensor 42 within the heat exchanger 6 in the top third of the tank 26. The reason for this is that the preferred system aims to ensure there is always hot water available to the user. Thus the desire to ensure heat exchange liquid 7 about the heat exchanger 6 is at an optimum temperature.

The optional timer 41 is included to ensure that the second heating element 5 is only turned on when hot water is likely to be required. For example, in most cases it is unlikely that hot water will be required at 3 am in the morning. Similarly for a working family hot water may not be required during the middle of a working day. Thus the timer 41 could be set to only allow operation of the second heating element ahead of and during times hot water is likely to be required. This saves on unnecessary heating and therefore costs.

If the second thermostat 36 via the second temperature sensor 42 detects a low temperature in the heat exchange liquid 7, and the timer 41 indicates a time when hot water may be required, power to the second heating element 5 is provided from mains power or some alternative power source. When either the temperature of the heat exchange liquid 7 is above a predetermined temperature, or the timer 41 indicates a non essential period, the power to the second heating element 5 could be cut.

In some arrangements a second heating element 5 may not be required. In other arrangements, although unlikely, the second heating element 5 may be constantly on. In other cases there may be a manual switch that a user operates to turn on the second heating element 5.

A further option is the inclusion of a tank fill pipe 15 which would allow for extra heat exchange liquid to be poured or pumped into the tank 26 if needed. In this case it would be preferred for the tank fill pipe to extend towards the bottom of the tank 26 so as to not mix with the warmer liquid at the top of the tank and/or negatively effect the heat exchange operation. In some arrangements a flexible fill pipe may be provided. Alternatively a rigid pipe will be used to provide a heat resistant hot water pipe with greater longevity. The fill pipe 15 could also be employed to fill the tank 26 during installation of the hot water system, or to empty the heat exchange liquid from the tank 26 if any maintenance issues required. Again ensuring the fill pipe 15 extends towards the bottom of the tank allows for the tank to be effectively pumped empty if necessary without the need for a drain pipe to be located at the bottom, or near the bottom, of the tank. In most situations the liquid may be also emptied using a siphon technique in lieu of pumping, or using gravity to do the work if a collection point can be found close by that is lower in level to the bottom of the fill/emptying pipe.

In one arrangement the filling pipe 15 can be copper to the upper third portion of the tank and then extended to the bottom of the tank via a heat resistant flexible pipe 24. Alternatively the pipe 15 could be polypropylene. The filling pipe 15 may also be configured to connect to a pump which would be particularly advantageous where there are on site difficulties in discharging or storing the emptied heat exchange liquid. Ideally a repair person would be able to store the heat exchange liquid for re-use after repairs.

The cold water inlet 3 can conveniently be connected to a mains water source, or alternatively another water source in some installations. The mains water passes through the water inlet 3 and then through the heat exchange coils 6. As the water passes through the pipes/coils it absorbs the heat energy from the heat exchange liquid and heats up. The heated water then continues through the pipes and out the water outlet (not shown in the cross section of FIG. 12).

The heat exchange coils 6 or heat exchanger, may form part of the lid assembly and will effectively hang from the lid 14 of the tank 26, and be centrally located in the tank 26. Ideally the axis of the tank would also form the axis of the heat exchanger. Conveniently the heat exchanger 6 will be connected to the lid 14. This could be by virtue of the water inlet and outlet, although further brackets could be provided either from the lid or the side wall of the tank 26. In some installations it may be the brackets that provide all the support to the heat exchanger, and the water inlet and outlets merely enable passage of water.

The heat exchanger 6 may be made of high grade copper or titanium, or in the future possibly a carbon nanotube based technology. Alternative materials could be used provided they have high conductivity and can structurally withstand the internal water pressure in the tank 26.

Figure 7:
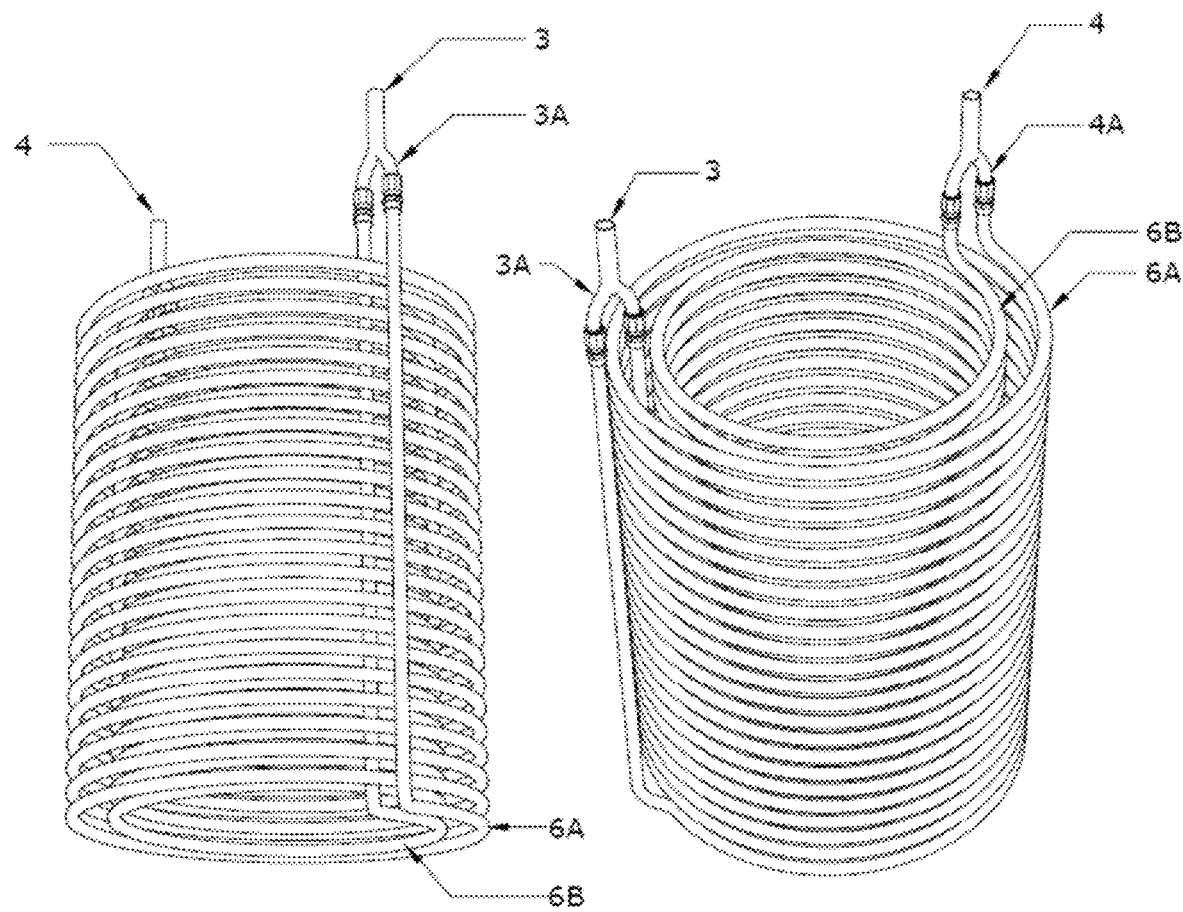
FIG. 7 shows the heat exchange coils in one embodiment of the present invention.

The cold water enters through the water inlet 3. It is then effectively split into two streams at a "Y" junction 3A, with both outlets from the Y junction 3A passing into separate coils of the heat exchanger 6. The heat exchanger may thus be considered a dual parallel spiral format as shown in FIG. 7. If the pipe leading to the water inlet was a conventional size of ½ inch (12.7 mm) in diameter, then the preferred diameter of the coils would be about ⅜ inch (9.52 mm). At the opposite end of the heat exchanger 6, the dual coils are recombined through an inversed Y junction 4A which is then connected to the hot water outlet 4. In this way there is a single source of cold water, and a single source of hot water, however the heat transfer in the heat exchanger is via dual coils.

In some arrangements the cold water inlet Y junctions 3A, and hot water outlet Y junction 4A, may be cast into the lid 14.

While the present invention has adopted dual parallel coils it will be appreciated that three or more parallel coils could also be used. However, it is expected that the efficiency of the present arrangement will mean that the added cost and complexity of more parallel paths will not be necessary in most cases. Higher parallel paths may be employed if higher water flow rates are used, or a lesser number of loops are included in the coil. In this later example having more parallel paths would effectively ensure the same total length of pipe in the heat exchange liquid.

By splitting the coil into parallel paths, the mains pressure is effectively slowed down while the water in the coils pass through the heat exchange liquid. The transition from one ½ inch pipe to two ⅜ inch pipes means that the total volume flowing through the heat exchanger will be slightly decreased, slowing the flow rate and increasing the friction and turbulence in the pipe. Therefore there will be a reduction of water pressure at the outlet of only about 10%, but resulting in less water being used at the tap. The pressure could be reduced by 5 to 15% in the coils compared to the inlet. The slowing of the water flow thereby takes advantage of the rising heat in the top part of the tank 26 allowing an improved heat exchange between the heat exchange liquid and water.

It is expected that this improved heat transfer will also lead to reduced water usage as the user will need less hot water. The water volume coming out of the shower head is less and therefore less hot water at the right temperature occurs. Because the friction and turbulence in the heat exchanger creates reduced effective pressure in the total system, a slowing of the water flowing out the system saves water with a small acceptable pressure drop through the system.

The ⅜-inch tube 6A, 6B engenders a low level turbulent flow in the pipes of the heat exchanger starting at the water inlet 3 at 500 kPa water pressure. This flow is half way between, laminar and turbulent flow resulting in a better rate of heat transfer against the wall of the pipe without reducing water pressure unduly. Laminar flow means there is little turbulence and the molecules flow along in a smooth mainly parallel way. Some Turbulence increases the rate of transfer as the molecules impact with the hot wall of the heat exchanger pipe. Too much turbulence adds too much friction and reduces the water pressure too much. A mid point is preferred. It is expected that the efficiency of this heat exchanger will be close to 100% ensuring that the temperature of the heat transfer liquid in the tank 26 will closely equate to the temperature at the water outlet 4 during a steady flow condition through the heat exchanger 6.

The effective total length of the heat exchanger 6 (including both parallel paths) is a measure of the length of the pipe passing through the heat exchange liquid. In other words if the coils of the heat exchanger were straightened into a single linear pipe the length would be the effective total length. The length for each installation may be determined by the climatic or weather conditions the tank is expected to operate in. Preferably these lengths may be:

Cold Climates 70-75 metres
Cool Temperate 50-60 metres
Warm Temperate 45-55 metres
Hot Dry Climate 46-50 metres
Tropical 25-30 metres Alternatively, a single length may be selected and used for all climates. However such an arrangement would not be expected to be as efficient for various climates.

The heat exchanger may occupy the top 30%-50% of the tank volume (as shown in FIG. 1 and FIG. 2). Preferably the heat exchanger will occupy about the top 30% of the tank volume. Colder climates will likely require a longer heat exchanger that will need to extend further down into the tank.

The lid 14 in the preferred arrangement includes supports or brackets 22, 23, which hang from the lid 14 to ensure that the copper coils of the heat exchanger 6 are located in the correct position. The brackets 22, 23 can be made out of plastic in the form of specially moulded poly-butylene or other carbon based material. In one embodiment the brackets of the assembly have a bracing support 23 to the wall of the tank 26, again made out of copper pipe or moulded carbon based material or poly-butylene.

The location and proportioning of the heat exchanger 6 is uniquely able to create current flows in the tank and thereby further improve the heat exchange efficiency. It is important to recognise that the present invention generates two different flows. There is water flowing through the heat exchanger, and a current flowing in the tank. There are thus references to mains pressure water flow in the heat exchanger which should not be confused with the current flow in the tank. It is anticipated that a solar hot water system incorporating the present tank thus helping to potentially allow 100% solar contribution from the DC elements and AC elements (directly and indirectly via off peak and grid connected offsets) is possible in all climates in the world.

Figure 5:
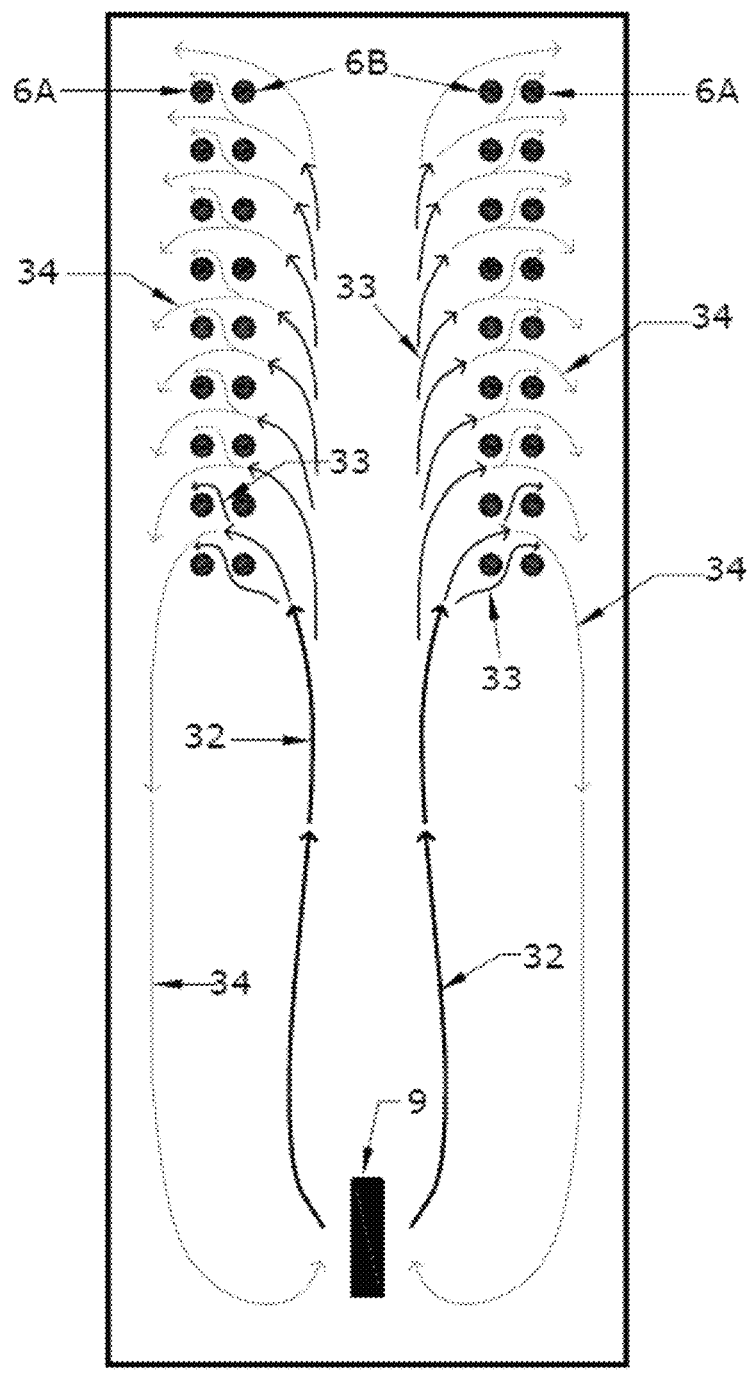
FIG. 5 demonstrates the current flow of liquid in the tank of an embodiment of the present invention.

As shown in FIG. 5, the configuration of the heat exchanger 6 in the present invention creates an even, smooth, laminar-type vertical flow 32 of heated liquid up through the double coil, and up and out at the top like a fountain, as well as completing its vertical rise the current has an upwards angular cross flow 33 from the inside heat exchanger towards the tank wall, joining the vertical flowing cooled liquid cascading downwards 34. The cooler flow comes down the inside surface of the tank wall.

This general current flow condition occurs while heating is in progress from the primary and/or secondary elements, but the currents speed up when the main pressure heat exchanger is activated as users are activating the tap and heat is being transferred from the heat exchanger, and cold liquid is flowing upwards inside the heat exchanger being progressively heated. The subsequent cooler denser heat exchange liquid ending up at the side wall falls to the bottom of the tank 34 driving the internal currents in the tank through the force of gravity.

These currents distribute hot water around the heat exchanger in an efficient and novel manner, ensuring faster temperature recovery for the consumer after extensive hot water use, such as a long shower or bath.

In more general terms, the heat exchange liquid is heated by element 9. This will act to heat the heat exchange liquid 7 in the tank 26. When there is demand for hot water from a user, cold water enters the bottom of the heat exchanger 6 in this embodiment. As the water flows up through the coils of the heat exchanger 6 heat is transferred from the heat exchange liquid 7 into the water. The heated water continues to flow up and out of the heat exchanger 6.

When water is flowing through the heat exchanger 6, the design of the present embodiment is such that a current flow is formed in the heat exchange liquid 7. As cold water flows through the heat exchanger 6, heat is transferred from the heat exchange liquid 7 into the water. This results in the heat exchange liquid 7 at the point of transfer to cool. The cooled heat exchange liquid 7, having transferred its heat into the water flowing through the coils 6A, 6B, will then cascade 34 down the wall of the tank 26. The cooled heat exchange liquid 7 will then be heated by the heating element 9.

As the heating element heats the heat exchange liquid 7, the heat exchange liquid 7 rises 32 through the middle of the tank 26. The heat exchange liquid 7 continues to rise through the middle of the heat exchanger 6. The current flow is such that the heat exchange liquid 7 passes over the inner coil 6B and between the inner coil 6B and outer coil 6A. While the heat exchange liquid 7 is about the coils 6A, 6B it can transfer its stored heat into the water inside the coils 6A, 6B.

This current path creates an efficient flow that substantially ensures heated liquid is not mixed with cooled liquid, and that heated liquid surrounds the heat exchanger and is efficiently replaced as heat transfer occurs.

In the preferred arrangement the heat exchanger 6 can be constructed out of high grade copper with two parallel pipes that split off from the incoming cold water supply pipe 3 above the lid 14 into the 'Y' junction cast into the lid 14 and forming into two ⅜ inch (or ½ inch pipes as an alternative heat exchanger) pipes that extend down to the bottom of the heat exchanger 6 assembly inside the tank 26. ⅜ inch or ½ inch pipes are conveniently selected as these are a standard available pipe. Other sizes could be used if preferred although it is likely that custom size pipes would then be required.

Each pipe bends into the inside 6B and outside 6A parallel upward spiralling pipes to form the heat exchanger. Ideally the outside pipe 6A needs to be set back about 90 mm from the inside wall of the tank 26 for a 300 litre tank. In the preferred arrangement the outside pipe 6A of the heat exchanger can have a radius of about 157.74 mm to the pipe centre line from the centre line of the inside of the tank 26 and the inside pipe 6B can have a radius of about 147.74 mm to the pipe centre line from the same point.

This creates a gap of about 15 mm between the inner and outer upwardly spiralling coils. The coils are preferably spaced about 12.7 mm apart as they spiral upwards to the underside of the lid 14 from which it is suspended.

This spiralling of both pipes continues up to about 55 mm from the bottom of the lid 14 creating the necessary gap for the heat flow currents that flow from inside the void of the heat exchanger 6 assembly in the central region of the tank 26 to the outside gap between the heat exchanger 6 and the wall of the tank 26, joining the cooler heat exchange liquid cascading down the inside of the tank 26.

When the two parallel pipes reach the top they join another 'Y' junction 4A that is the outlet 4, melding back into a ½ inch pipe projecting out of the lid 14. This becomes the hot water supply pipe servicing the outlets in the building.

In Temperate climates it is envisaged that the number of turns will be 24 for the outside coil and 23 for the inside coil.

Apart from the heat exchanger 6 connecting with water proof threaded connections to the two lid cast-in 'Y' junctions, extra support can be provided by specially formed structural supports assisting with hanging the heat exchanger 6 from the lid 14. For such installations these could be stronger plastic hanging struts with special notches to take the inside and outside copper coils holding them securely and tightly in position and holding them apart both the space between the coils creating a gap for upward current flows as well as holding the gaps between the spiralling pipes in both the inside and outside pipes.

The parallel coils of the heat exchanger 6 may be held together by plastic structural supports 22. The supports may for example be made from moulded poly-butylene or similar material with the structural tensile/compressive strength needed, while also being temperature resistant. In some arrangements there may be four supports 22 evenly spaced around the heat exchanger 6. The supports 22 could hang from locating notched moulded projections cast into the inside of the tank 26 at the top and bottom of the heat exchanger 26. The supports22 could be hockey stick shaped with moulded recesses or metal for clipping in the parallel formatted coil assembly at the desired spacing.

These supports which can provide greater structural integrity may also conveniently be connected to the lid 14 so as to further stabilize the heat exchanger solidly in position 22. This is particularly advantageous in guarding against dislodgement during transportation and also handling during installation.

At the bottom of the heat exchanger 26, the hockey stick shaped supports 22 may sit neatly into notched projections cast from the wall of the tank 14. At the bottom of these support portals special arms can project across to the central location to hold steady the element cable housing 25 as well as the fill pipe tube 24.

This relatively open configuration should provide minimum impediment to the rising hot water currents in the tank 26. This arrangement keeps the heat exchanger 6 well clear of the internal perimeter tank wall and the cooler cascading liquid which falls down the inside surface of the tank 26 as water is flowing through and being heated by the heat exchanger.

Figure 3:
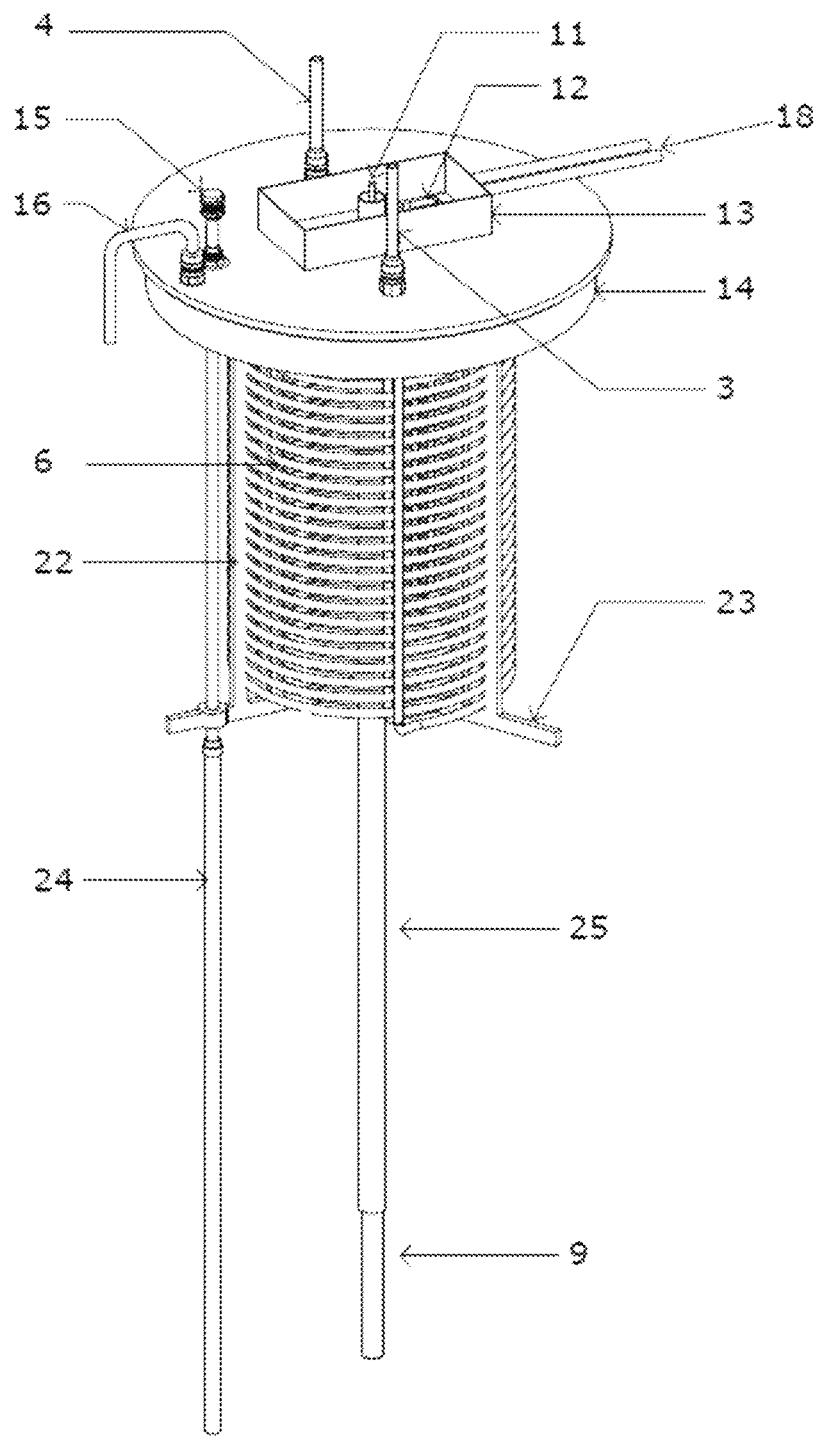
FIG. 3 exemplifies a lid assembly of one embodiment of the present invention.

In some implementations, the tank 26 may also include an electrical connections box 13, as shown in FIG. 3, to accommodate the power cables to the two elements. Inclusion of a connections box can simplify installation by effectively making it clear where electrics entering the system are housed. The box can also be an added safety feature and assist with water proofing of the connections.

Figure 4:
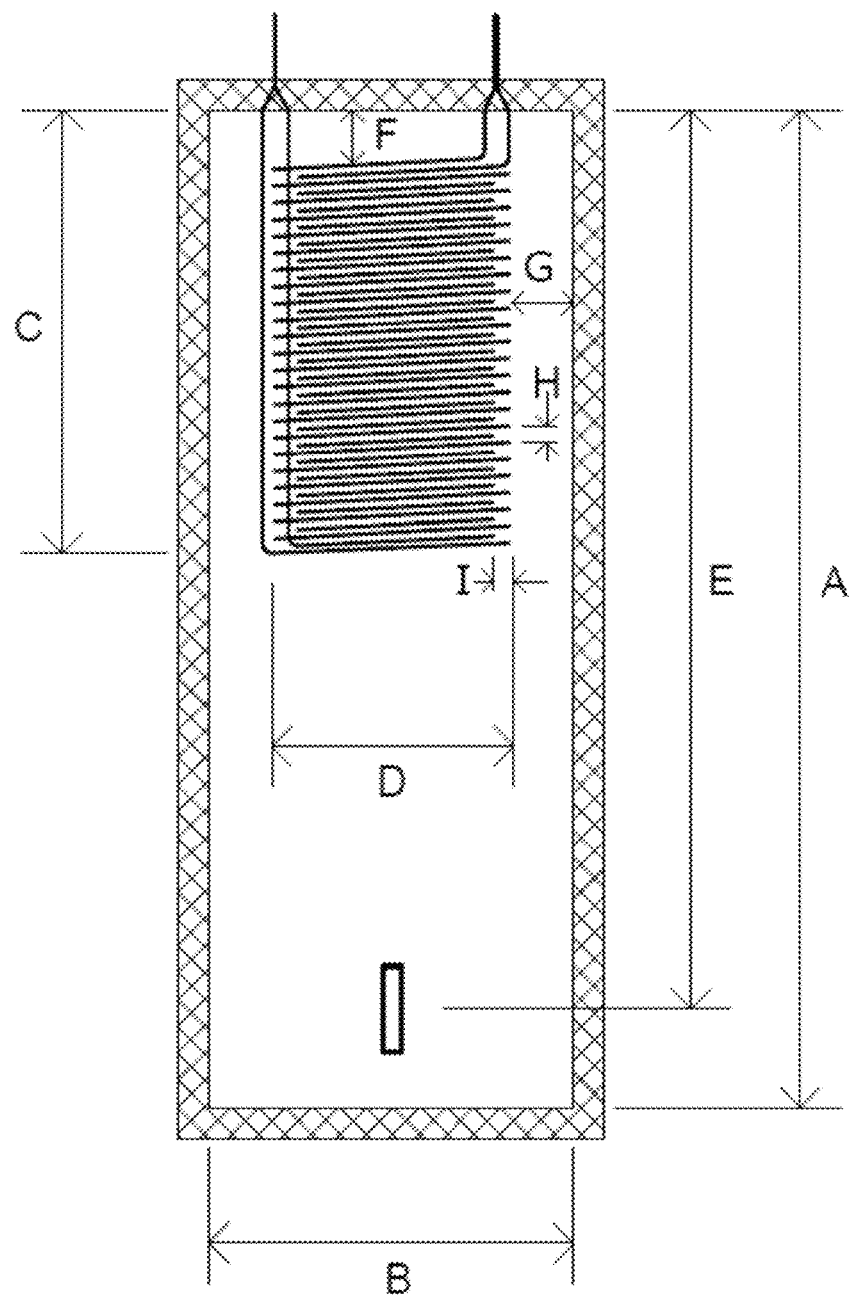
FIG. 4 exemplifies tank proportions of one embodiment of the present invention.

Turning now to FIG. 4, the relative dimensions of the preferred embodiment are set out. We will assume that the tank is designed with a capacity to heat 300 litres of domestic hot water. However, it will be understood that smaller or larger capacity tanks could be employed using the same ratios or relativities described below.

The preferred arrangement to provide 300 litres of hot water will include about 300 litres of heat exchange liquid inside the tank 26. To achieve this, the tank will have a diameter B of between 400 mm and 600 mm, and preferably around 500 mm, and height A of between 1400 mm and 1600 mm, and preferably about 1500 mm measured between the lid and inside floor of the tank.

The primary element 9 could be suspended from the lid 14 between 1000 mm and 1300 mm to the centreline of the primary element 9 as indicated by item E in FIG. 4, and ideally will be suspended about 1300 mm from the underside of the lid. The preference is to ensure that a 100 mm gap is maintained between the bottom of the tank 26 and the bottom end of the element 9.

The tank 26 is sized to house the heat exchanger 6 at the top third position as shown by item C of the tank 26. For temperate climate applications, C will preferably be between 500 mm and 700 mm. For climates ranging from tropical regions with smaller dimensions to cold frigid climates with larger dimensions, C will preferably be between 270 mm and 1000 mm. The heat exchange liquid will continually rise from the bottom of the tank 26 as it is heated by the primary element 9. The primary element 9 is centrally located relative to the side wall to continually heat the heat exchange liquid, and thereby the heat exchanger 6, and can be held in position by the housing 25 which itself could be connected to the bottom of the heat exchanger 6 by a lateral brace 23.

In the preferred arrangement the heat exchanger 6 comprises a dual set of coils. The outer coils of the heat exchanger 6 may be located 55-75 mm below the underside of the lid 14, as marked by item F, and 90-100 mm away from the inside surface of the wall of the tank 26, as marked by item G. In one embodiment the heat exchanger 6 is located 55 mm below the lid, and 90 mm from the side wall.

It is considered that this relative spacing allows an ideal space for cascading cool internal descending heat exchange liquid to fall in a laminar flow manner so as not to disturb the rising hot heat exchange liquid through the central regions of the tank 26 moving up and through the heat exchanger 6.

Each turn of the coil 6 will be between 9.52 mm and 15 mm apart, and ideally 12 mm apart, as shown as item H. The gap between two parallel turns marked as item I will be between 15 mm and 25 mm apart, and ideally 15 mm apart. The diameter of the heat exchanger will be about 325 mm to the edges. It is thought that this spacing enables a more efficient distribution of heat to the outer surfaces of all of the heat exchanger pipes for the entire lengths of the two parallel coiled sections.

Further, the proportioning of the gaps at the top (under the lid) F, as well as the gaps to the side of the tank G creates a smooth efficient laminar-type flow regime so rising hot water does not mix with the falling cooler water that has emerged on the inside surface of the tank.

As shown in FIG. 4 the relative proportions of the preferred embodiment is Lid Gap: Side Gap: vertical Gap between spiralling pipes: Gap between Parallel Coil sets (F):(G):(H):(I)=(55-75):(90-100):(12-15):(15-25). This ratio works to ensure the correct current regime to make the tank work more efficiently for most, if not all climates.

For a tank for use in a temperate climate, the heat exchanger 6 has a diameter of between 300 mm and 400 mm, marked as item D. Preferably the diameter will be about 325 mm when the internal diameter of the tank B is about 500 mm. Item A can be 1500 mm for a 300 litre tank version. The diameter D should be adjusted to accommodate the length of the heat exchanger for the various climatic zones.

It is expected that D will be fixed for 300 litre tanks but will increase proportionally with larger tanks. For example, a 450 litre tank could result in D becoming about 402 mm. The dimensions for C will likely depend on the number of turns in the coil. For example in tropical climates C could be about 140 mm, in cold frigid climates about 900 mm and for temperate climates about 597 mm.

Table 1 below provides recommended overall system configurations required for various climates.

TABLE 1

Suggested System Sizing for Climatic Zones

| Climate Type | Winter water supply temperatures (° C.) (3) | Booster size (5) (kW) | Turns in heat exchanger coils External/Internal (6) (6A), (6B) (No) | Panels in photovoltaic array (1) (W/panel) |
|---|---|---|---|---|
| Cool to Warm Temperate | 13-18 | 2 kW | 24/23 | 4/320 |
| Hot Dry | 18-25 | 1.5 kW | 20/19 | 4/320 |
| Sub Tropical | 25-28 | 1.25 kW | 16/15 | 3/320 |
| Tropical | 28-32 | NIL | 12/11 | 2/320 |
| Cold Frigid | 6-10 | 3 kW | 36/35 | 8/320 |

As can be seen most climates should only need to use up to 4/320 W photovoltaic panels 1 (especially those panels with higher performance in cloudy conditions) for a 300 litre tank 26. Such an array should deliver heat via a 1.2 kW rated DC resistance element 9, representing enough power to completely heat the static tank without boosting over a full day of sunshine during warm and summer months. In winter and mid season, the contribution will be 60-90%, with the remainder being supplied via the AC booster element 5 on an as needs basis.

The booster element 5 could be sized as 1 kW in tropical and hot climates, 2 kW in cool and warm temperate climates and 3 kW in cold over cast climates, which should meet most domestic needs. In cold weather such AC booster elements 5 could virtually act as instantaneous boosters during high usage times. However such need is not expected for average family use due to the thermal inertia benefits of the present invention.

The present invention provides a very efficient way to maximize solar energy contributions. The primary heat source at the bottom, and the secondary boosting system at the top third of the tank, can ensure that 50° C. is maintained for the whole 300 litres, and not just the top of the tank as is the case with most conventional hot water systems.

The present tank addresses a number of problems associated with standard solar hot water systems.

The need for a sacrificial anode required in some conventional systems is also eliminated, along with and its associated maintenance requirements. The present invention is not a pressure vessel, nor does it have any components that are corrosion prone. All metal fittings and fixtures may be copper or brass, and the primary liquid can be treated with tannin additive.

Limitation of pressure (500 kPa) at the boundary for the mains cold-water connection to a residence, and therefore keeping such a valve well away from the hot water tank reduces potential referred scale build up.

Non-return valve is located well away from the hot water source resulting in a non-corroding or scale formation advantage compared to most systems (3), 200 mm minimum is recommended. If the non return valve is too close to the hot water of the tank rising up the cold water supply and is too close the valve will constantly be in a heated situation. This will increase degradation via corrosion and possible deposition of salts degrading the valve prematurely.

One unique feature of the preferred embodiment is that all the internal components of the tank are suspended from the top or lid 14 of the tank 26. It will be appreciated that in some arrangements the lid may instead be an integral part of the tank and thus not removable. By ensuring the components enter through the top means that no penetrations are needed in the side walls. It will be appreciated that the absence of penetrations means the side walls do not have created weak spots, or potential leak points. A known problem with existing systems is that leaks can occur around the penetrations. To date this has simply been an accepted problem. Conventional design required side penetrations into the tank. These side penetrations were considered necessary and in response steps were taken to try and minimise any leaks or other problems. However, the problem remained.

Use of the special mains pressure double spiral high-grade copper coil (or alternate metal or carbon based) heat exchanger (out of ½ inch to ⅜ inch tube). This ensures that inert water used comes straight from the mains avoiding any bacteria issues normally associated with hot water main pressure vessels.

The 50° C. limit set for primary liquid also reduces any potential for boiler scale or calcification of valves close to the system, eliminating maintenance calls. It also eliminates the need for any pressure release valves on the tank itself.

A plastic inner tank 26 and lid 14 ensures a completely inert environment to corrosion. This is an enormous advantage for use in hot water systems (especially indirect systems).

This inert corrosion proof environment can be extended to the heat exchanger by de-oxygenating and limiting bacterial growth in the heat exchange liquid. This can be achieved by treating the heat exchange liquid with tannin oxygen scavenger additive, virtually completely protecting any metallic components and fixtures inside the tank. This eliminates corrosion on the outside surfaces of the heat exchanger or any metal fittings or fixings located internally inside the tank.

There are no corrosion issues for the tank itself when made out of spun or moulded plastic (for example 10 mm corrugated polyethylene) 26. This inert tank has full structural strength at operating temperatures involved as well as being totally isolated with extra support by the insulation and external stressed skin ensuring a very long life (possibly up to 40 to 50 years). The maximum temperature that the plastic lid 14 has to endure is about 54° C. at the bottom of the lid surface, and polyethylene remains chemically stable under 80° C. The lid assembly is very strong and well insulated above with no water pressure applied to any of the penetrations making it easier to water proof the tank compared with conventional systems.

The primary heating element 9 can be a DC electrical resistance type built possibly out of stainless steel and should not be subject to corrosion due to the treated water environment created. The DC element 9 is suspended from the inlet 11 down a tubed housing 25 via a waterproof, heat resistant flexible cable. In the unlikelihood of the DC element ever needing replacement this all can be accessed from the DC element inlet 11 on the top of the tank, withdrawn, replaced and lowered back down the tube to its proper position in the tank E to the centreline position.

The heat exchanger of the present invention uniquely balances the rate of heat exchange, with the rate of use at the tap, which has not been properly addressed previously in solar hot water systems. This means that the temperature drop of the heat exchange liquid is minimal as the falling cold liquid down the side of the tank flows right to the bottom of the tank without mixing with the rising hot liquid of the tank. The top third of the tank is occupied fully by the dual parallel flow heat exchanger and therefore maximum temperature is always maintained for the mains water supply.

This juxta-positioning of the primary heat source is better than other vertical hot water tanks, and it is expected that recovery of tap water temperatures at the main outlet 4 will be faster than other heat exchange systems. This is because a fresh source of hot liquid is constantly rising from the bottom to replace the hot liquid used via the heat exchanger 6 at the top.

An advantage of this arrangement is that the upwards flowing heated liquid passes through the middle of the heat exchanger, and does not mix in with the cascading perimeter current which would create unnecessary turbulence, slowing down the heat replacement around the heat exchanger from the rising heat in the middle void as well as the gap between the parallel coils of the heat exchanger.

Based on thermal simulations the Applicant believes that the present invention greatly improves the thermal efficiency of the hot water tank making the thermal inertia strategy in the primary fluid highly effective over a 24 hour cycle. The present invention is thought to be 3 to 5 times more efficient than a conventional hot water tank. This is due in part to the increased thermal resistance of the surface air resistances beyond the reflective skin, and to the air bubbles created by the corrugations prior to the rigid moulded insulation, the plastic tank and the tea pot effect of the aluminium outer skin. This enables any necessary boosting to occur at night during off peak power supply periods where needed.

In the preferred embodiment of the present invention, the efficiency of the tank, together with an off peak boosting system, enables the use of PV directly or via the grid for economic heating of water. The grid-connected PV alternative allows the possible dumping of excess renewable energy into the hot water tanks rather than exclusively into expensive battery systems, thus potentially reducing storage costs for both consumers and utilities. This facility also adds management flexibility for utilities, reducing the oversupply of renewable energy into the grid and assisting utilities in managing the stability of electricity supplies in the grid system.

A further advantage of the present invention is the reduced need for tempering valves. As noted in the background section, conventional hot water systems include a number of tempering valves to release pressure and/or reduce freezing. In many cases, these can be considered a safety feature and a required standard. In the present invention, a tempering valve is unnecessary. This is because the heat exchange fluid, including any used additives, and the segregation of the mains pressure water through the heat exchanger remove the risk of pressure build up, and hence the need for a pressure release valve. However, should a standard require the use of a tempering valve then the present invention could include one at the outlet of the system. Limiting a hot water tank to a single valve, if required, reduces both production and maintenance costs.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment.

Furthermore, the particular features, structures, or characteristics may be combined in any suitable manner in one or more combinations. It will be appreciated that persons skilled in the art could implement the present invention in different ways to the one described above, and variations may be produced without departing from its spirit and scope.

Any discussion of documents, devices, acts or knowledge in this specification is included to explain the context of the invention. It should not be taken as an admission that any of the material forms part of the prior art base or the common general knowledge in the relevant art, in any country, on or before the filing date of the patent application to which the present specification pertains.

The invention claimed is:
1. A hot water tank including:
 a shell enclosing a chamber containing a heat exchange liquid, said shell including a base, a side wall, and a lid;
 a heat exchanger comprising multiple parallel coils running from a first end of the heat exchanger to a second end of the heat exchanger;
 a cold water inlet connected to the first end of the heat exchanger, the cold water inlet transitioning from a first diameter to the multiple parallel coils, each of smaller diameter than the cold water inlet, such that there is reduced water flow rate and induced turbulence through the heat exchanger, the multiple parallel coils recombining at a hot water outlet connected to the second end of the heat exchanger, wherein the heat exchanger is located above a midline of the chamber, wherein the midline is located substantially half way between the lid and the base; and
 an electrical primary heating element connected to a power source for heating the heat exchange liquid, the electrical primary heating element being located in a lower portion of the chamber, the electrical primary heating element being suspended in the heat exchange liquid from or through the lid.

2. The hot water tank as claimed in claim 1, wherein the electrical primary heating element is a DC element, and the power source is a photovoltaic panel array.

3. The hot water tank as claimed in claim 1, wherein the electrical primary heating element is an AC element.

4. The hot water tank as claimed in claim 1, wherein the cold water inlet, said hot water inlet and the electrical primary heating element pass through the lid.

5. The hot water tank as claimed in claim 1, wherein said heat exchanger is located in a top half of the chamber, and the electrical primary heating element is located in a lower third of the chamber.

6. The hot water tank as claimed in claim 1, wherein the electrical primary heating element is located nearby the base.

7. The hot water tank as claimed in claim 1, wherein the electrical primary heating element is suspended in the heat exchange liquid.

8. The hot water tank as claimed in claim 7, wherein the electrical primary heating element is suspended from or through the lid.

9. The hot water tank as claimed in claim 1, wherein the electrical primary heating element is located substantially along a center line passing vertically through the hot water tank.

10. The hot water tank as claimed in claim 1, further comprising a fill pipe passing through said lid to enable said heat exchange liquid to be added or removed from said shell.

11. The hot water tank as claimed in claim 1, further including a controller adapted to switch the electrical primary heating element on or off.

12. The hot water tank as claimed in claim 1, wherein:
 the multiple parallel coils comprise an inner coil and an outer coil; and
 the heat exchanger defines:
  a gap between the inner coil and the outer coil; and
  a central void.

13. The hot water tank as claimed in claim 12, further comprising a second electrical heating element connected to a second power source, wherein:
 a connection between the second electrical heating element and the second power source passes through the lid; and
 the second heating element is located towards a top of the chamber and within the central void of the heat exchanger.

14. The hot water tank as claimed in claim 1, wherein:
 the chamber comprises a corrugated wall;
 a preformed insulation portion is provided between the shell and the corrugated wall; and
 the insulation portion is cylindrical-shaped such that corrugations of the corrugated wall provide partial sine-wave shaped air gaps between the insulation portion and the corrugated wall.

15. The hot water tank as claimed in claim 14, wherein the insulation is encased in a reflective aluminum outer skin.

16. The hot water tank as claimed in claim 13, further comprising:
 a primary controller comprising:
  a first temperature sensor connected to a first thermostat, the first temperature sensor being located in a lower portion of the chamber, away from the electrical primary heating element;
  a first switch that is configured to:

be activated to turn the electrical primary heating element on in response to a temperature of the heat exchange liquid being below a predetermined temperature; and be activated to turn the electrical primary heating element off in response to the temperature of the heat exchange liquid being above the predetermined temperature; and a second switch that is configured to enable electrical energy from the first power source to be passed to an inverter that is electrically connected to a mains power grid when the electrical primary heating element is off;

a secondary controller comprising:

a timer; and a second temperature sensor connected to a second thermostat, the second temperature sensor being located within a top third of the chamber;

wherein:

the secondary controller is configured to activate the second electrical heating element when the second temperature sensor indicates a low temperature in the heat exchange liquid and the timer indicates a time when hot water is likely to be required; and the secondary controller is configured to deactivate the second electrical heating element when the second temperature sensor indicates a high temperature of the heat exchange liquid or the timer indicates a non-essential period.

17. A hot water tank including:

a cylindrical shell enclosing a chamber containing a heat exchange liquid, the shell including a base, a side wall, and a lid;

a heat exchanger immersed in the heat exchange liquid, the heat exchanger comprising multiple parallel coils running from a first end of the heat exchanger to a second end of the heat exchanger;

a cold water inlet connected through the lid to a first splitter of the first end of a heat exchanger, and a hot water outlet connected through the lid to a second splitter of the second end of the heat exchanger, wherein the heat exchanger is located above a midline of the chamber, wherein the midline is located substantially half way between the lid and the base; and an element housing passing though the lid and towards the base, said element housing adapted to locate a DC heating element nearby the base for heating the heat exchange liquid, the DC heating element being configured to be connected to a photovoltaic array, wherein the multiple parallel coils connect the first splitter and the second splitter, the cold water inlet transitions from a first diameter to the multiple parallel coils via the first splitter, a diameter of each of the multiple parallel coils is smaller than the first diameter, such that there is reduced water flow rate and induced turbulence through the heat exchanger, and the multiple parallel coils recombine at the hot water outlet, via the second splitter.

18. The hot water tank as claimed in claim 17, wherein:

the multiple parallel coils comprise an inner coil and an outer coil; and the heat exchanger defines:

a gap between the inner coil and the outer coil; and a central void.

19. The hot water tank as claimed in claim 18, further comprising a second electrical heating element connected to a second power source, wherein:

a connection between the second electrical heating element and the second power source passes through the lid; and the second heating element is located towards a top of the chamber and within the central void of the heat exchanger.

20. A hot water tank as claimed in claim 17, further comprising a fill pipe passing through said lid to enable said heat exchange liquid to be added or removed from said shell.

21. The hot water tank as claimed in claim 17, wherein:

the chamber comprises a corrugated wall;

a preformed insulation portion is provided between the shell and the corrugated wall; and the insulation portion is cylindrical-shaped such that corrugations of the corrugated wall provide partial sine-wave shaped air gaps between the insulation portion and the corrugated wall.

22. The hot water tank as claimed in claim 21, wherein said insulation is encased in a reflective aluminum outer skin.

23. The hot water tank as claimed in claim 19, further comprising:

a primary controller comprising:

a first temperature sensor connected to a first thermostat, the first temperature sensor being located in a lower portion of the chamber, away from the electrical primary heating element;

a first switch that is configured to:

be activated to turn the electrical primary heating element on in response to a temperature of the heat exchange liquid being below a predetermined temperature; and be activated to turn the electrical primary heating element off in response to the temperature of the heat exchange liquid being above the predetermined temperature; and a second switch that is configured to enable electrical energy from the first power source to be passed to an inverter that is electrically connected to a mains power grid when the electrical primary heating element is off;

a secondary controller comprising:

a timer; and a second temperature sensor connected to a second thermostat, the second temperature sensor being located within a top third of the chamber;

wherein:

the secondary controller is configured to activate the second electrical heating element when the second temperature sensor indicates a low temperature in the heat exchange liquid and the timer indicates a time when hot water is likely to be required; and the secondary controller is configured to deactivate the second electrical heating element when the second temperature sensor indicates a high temperature of the heat exchange liquid or the timer indicates a non-essential period.

* * * * *